April 26, 1949.　　　　　J. B. CEJKA　　　　　2,468,391
AUTOMOTIVE VEHICLE ANTENNA
Filed Dec. 3, 1947
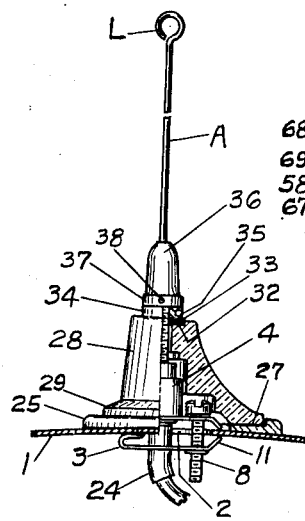
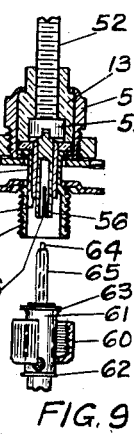
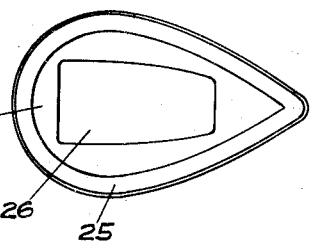
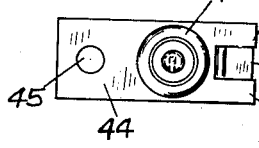
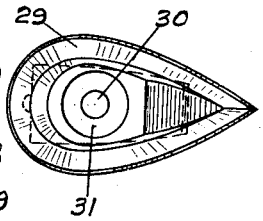
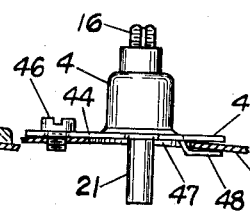
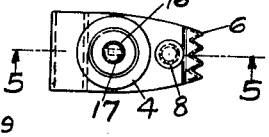
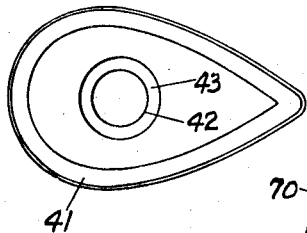
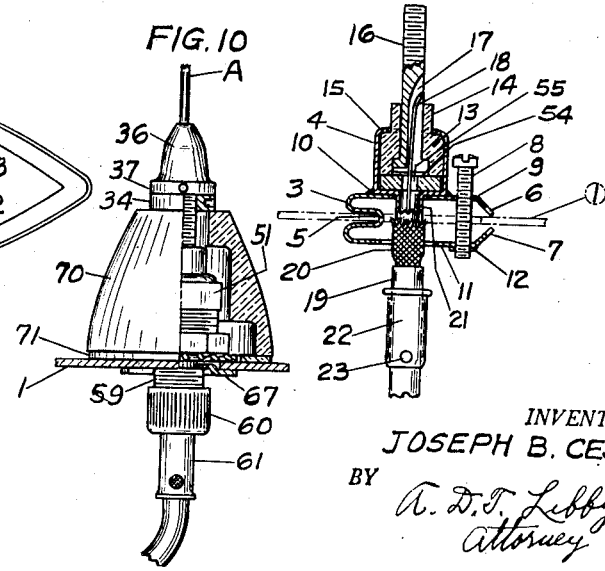
INVENTOR.
JOSEPH B. CEJKA
BY
A. D. T. Libby
Attorney Patented Apr. 26, 1949

2,468,391

UNITED STATES PATENT OFFICE 2,468,391

AUTOMOTIVE VEHICLE ANTENNA

Joseph B. Cejka, Highland Park, N. J., assignor to L. S. Brach Mfg. Corp., Newark, N. J.

Application December 3, 1947, Serial No. 789,417

13 Claims. (Cl. 174—153)

This invention relates to the construction of an antenna especially adapted for use on automotive vehicles, particularly those used in police and fire alarm service where high frequency sets are utilized so as to be free from interference with frequencies used in the general radio broadcast system.

It is the principal object of my invention to provide a high frequency automotive vehicle antenna which can be, on account of the short length of the antenna, mounted on the car roof top, preferably near the center thereof where the roof is more nearly level, although it is to be understood that the device is not limited to this particular location.

My invention and its application to an automotive vehicle will be readily understood by reference to the annexed drawings wherein:

Figure 1 is a part sectional and part elevational view showing the structure attached to the roof of the car, only a small section of which is shown.

Figure 2 is a plan view of the sealing pad used in connection with the structure shown in Figure 1.

Figure 3 is a top plan view of the insulator used in mounting the structure.

Figure 4 is a view, on a somewhat enlarged scale from that shown in Figure 1, looking at the top of the gripping member used for engaging the roof of the car, without the antenna.

Figure 5 is a view on the line 5—5 of Figure 4 showing the other parts associated with the gripping member and with the antenna cable in partially assembled position.

Figure 6 is a view showing a slightly different form of mounting member and sealing pad.

Figure 7 is a plan view of the sealing pad shown in Figure 6.

Figure 8 is a view similar to Figure 6, but showing a modified form of the gripping member.

Figure 9 is a top plan view of Figure 8.

Figure 10 is a part elevational and part sectional view of a further modified form of construction.

Figure 11 is a sectional view of the interior and associated parts shown in Figure 10.

In the various views wherein like numbers refer to corresponding parts, 1 is a fragmentary portion of the car top which is somewhat curved as indicated. To install the structure on the car top 1 a hole 2 is drilled therein to receive a gripping device 3 that is carried by an antenna mounting member 4. As shown particularly in Figure 5 the gripping member 3 is preferably formed in one piece having a U-shaped loop 5 formed therein so the width of the loop is somewhat wider than the thickness of the roof 1. The free ends of the member 3 are provided with teeth 6 and 7 which are adapted to engage the wall of the roof around the hole 2 when the set screw 8 is moved to tightening position. One arm 9 of the gripping member 3 is fastened to the hollow mounting member 4 as by soldering indicated at 10. The arm 9 has a clearance hole for the screw 8 while the opposite arm 11 has a threaded hole to receive the screw 8. Preferably, the metal 12 forming part of the threaded hole is formed outwardly to provide extra threads for the screw 8 so that when this screw 8 is moved to locking position, the fingers 6 and 7 are forced to grip the roof 1, thereby locking the mounting member 4 securely in position on the roof of the car. The hollow mounting member 4 carries an insulator 13 within its confines. The member 13 has an end 14 of reduced diameter projecting from the member 4, the end of which is spun over at 15 to hold the insulator 13 within the cup-shaped member 4. The insulator 13 carries a threaded stud 16 which has a passageway 17 therein to receive the bared end of an inner conductor 18 of a co-axial cable 19. The outer conductor 20 of the cable 19 is illustrated as of the woven type and is adapted to be slipped over a stem 21, preferably made integral with the mounting member 4. To hold the conductor 20 in place on the stem 21 a metal sleeve 22 is forced over the outer conductor 20 and is preferably locked in position thereon by solder applied through one or more holes 23 in the outer end of the sleeve 22, it being understood that the conductor 20 is bared sufficiently to receive the solder through the hole 23. It is to be also understood that the conductor 18 is soldered to the stud 16 at the point where it emerges from the passageway 17 just above the shoulder 14 of the insulator 13. To further insure that the sleeve 22 is held in place, a sleeve 24 of elastic material, such as rubber, may be slid over the metal sleeve 22 gripping both the cable 19 and the sleeve 22. After the parts have been assembled as described with respect to Figure 5, the mounting member 4 and assembled parts, without the screw 8, are ready to be fastened to the roof 1 of the car. This is done by tilting the gripping member 3 and passing the toothed end thereof inwardly through the hole 2 and over the opposite sides of the top 1 and moving it to one side so that the loop end comes into alignment diametrically with the opposite side of the hole whereby the loop 5 can be slipped over the wall of the hole after which the screw 8 is inserted into place and moved to fastening position as indicated in Figure 1. After the mounting member is thus fastened in place on the roof 1, a sealing pad 25 is placed into position as shown in Figure 1. The pad 25 has an opening 26 therein to fit around the arm 9 of the clamping member 3. It also has a depressed surface 27 which forms the opening 26, to receive a rigid insulator 28 having a base portion 29 to fit within the depressed surface 27. The interior of the insulator 28 is formed during its molding operation to give clearance surface for the head of the screw 8 and the mounting member 4 and the end 14 of the insulator 13 and a hole 30 through its upper end to receive the threaded end of the stud 16. Preferably, the outer end of the insulator 28 has a recess 31 therein to receive a flexible sealing washer 32 and a metal washer 33 of suitable metal such as Monel. A lock nut 34 preferably circular in form is then applied to the stud 16 to lock, by means of a spanner wrench having a finger to engage a hole 35 in the nut 34, the rigid insulator 28 securely in place, and to force the sealing pad into close engagement with the top 1 of the car. An antenna A has a member 36 fastened thereto. The member 36 has preferably a flanged portion 37 with a spanner wrench hole 38 therein so that the antenna may be securely locked to the nut 34. As shown, the free end of the antenna A has a static loop L therein.

It may be mentioned in passing that the head of the stud 16 has a plurality of teeth or serrations therein so when it is forced into the insulator 13 it may be held securely therein without turning, for reasons which will later appear. Also, to prevent the head of the stud 16, if it should become loose, from ever contacting with the metal of the mounting member 4, an insulator 54 is utilized in the bottom of the cup 4 and has a small hole 55 therein to pass the conductor 18.

In Figure 6 the gripping device 39 is welded to the stem 21 and is provided with a gripping edge 40 to grip into the car top 1 when the lock nut 34 is drawn up. The pad 41 used with this construction is very similar to pad 25 except that it has a round hole 42 therein with an annular depressed area 43 against which the bottom of the mounting member 4 rests.

In Figure 8 the gripping member comprises a clamping plate 44 having a hole 45 therein to receive a clamping screw 46 that engages a threaded hole in the car top, it being understood that this hole is made and tapped adjacent the larger clearance hole 47. The opposite end of the clamping device 44 has a lug 48 formed downwardly so as to pass under the top 1 of the car, while the two adjacent fingers 49 and 50 on opposite sides of the lug 48 engage the upper surface of the car top 1. The mounting member 4 is fastened to the plate 44 as by welding or soldering with the stem 21 projecting through the clearance hole 47 in the plate 44. The sealing pad and insulator 28 are not illustrated in this figure.

Where the car roof is quite thin, the plate 44 may have the hole 45 threaded to take the screw 46 and the plate 44 passed through the hole 47 and used in upside down position from that shown in Figure 8.

From what has been said it will be readily seen that antenna A may be readily and securely mounted to the top of an automobile. It being understood that after a suitable hole is drilled on top, the paint is scraped off from the top surface and underside so that the clamping device can make good contact with the frame of the car to provide a car ground contact.

When it is desired to mount the structure on surfaces having a greater curvature than that on the top of a car it may be necessary to use a rubber cement or sealing material around the sealing pad.

In Figures 10 and 11 the mounting member 51 is slightly different from the mounting member 4 of Figure 5, and the insulator 13 carried thereby is the same as shown in Figure 5 but the stud 52 carried by the insulator 13 is slightly different in its construction from the stud 16, in that it has a slot in its head 53 to receive the end of a connector 56 which is pressed into the head 53. The connector 56 is positioned within an insulator 57 that in turn is located within the member 58 forming an extension of the mounting member 51. The free end of this extension which is hollow, is threaded at 59 to receive a tubular nut 60 which is internally threaded to engage the threads 59. The nut 60 is carried on a sleeve 61 that is fastened to the outer conductor 20 of a co-axial cable. The sleeve 61 has flanges 62 and 63 at its ends to hold the nut 60 in slidable position thereon. The inner conductor 64 of the co-axial cable is fastened to a plug 65 that is adapted to fit the split socket end 66 of the conductor 56 after which the nut 60 is drawn up to securely hold the cable to the extension 59 which projects through a hole in the top 1 or other part of the body of the vehicle. Adjacent the threaded end 59 of the extension is located a clamp 67 that is adapted to be drawn against the body portion of the vehicle at the hole therein, it being understood that the structure shown in the outer part of Figure 11 is assembled through the hole in the same manner as previously described for the other forms of the device. The mounting member 51 is threaded with a left-hand thread to receive a nut 68 that is adapted to force a lock washer 69 against the body portion at the hole and to draw the clamp 67 securely into locking position. The reason for using a left-hand thread on the member 51 is so the turning of the nut 34 of the antenna member 37 will not loosen the mounting connection with the body.

Between the parts of the antenna per se and the body top 1 there is located a housing of suitable insulating and rigid material which encloses the mounting member and associated parts, a gasket 71 of flexible material being located at the base of the housing 70.

It will be obvious that many of the details may be varied without departing from the spirit of my invention and the scope of the impending claims.

Having thus described my invention, what I claim is:

1. An antenna for mounting on the roof of an automotive vehicle including a metallic hollow mounting member having a hollow stem extending therefrom to receive an insulated conductor, an insulator carried by said member and extending from said member in a direction opposite to said stem, a threaded stud carried by and extending upwardly from the insulator, said stud having a passageway therein to receive the bared end of said insulated conductor, a gripping device carried by said mounting member and adapted to engage opposite sides of the wall of a hole in the car roof with means for positively locking said device in position on the roof, a flexible sealing pad surrounding said mounting member, a rigid upstanding insulator positioned on said pad and covering said mounting member and gripping device, means on said threaded stud for locking said rigid insulator in place and an antenna rod having a threaded member at one end to engage the threaded end of said stud and to lock against said stud locking means.

2. An antenna construction as defined in claim 1 further characterized in that said gripping device comprises a piece of suitable metal folded at one end so as to form a U loop adapted to fit closely over the roof material at the hole, the device having two spaced arms extending from said folded end with the ends of said arms having pointed fingers extending toward each other to engage opposite sides of the roof, one arm having a clearance hole therein while the other arm has a threaded hole opposite said clearance hole to receive a screw for forcing said fingers on the arms into gripping relation with the vehicle roof.

3. An antenna construction as defined in claim 1 further characterized in that said gripping device comprises a pair of spaced arms joined at one end by a formation which can be slipped over the car roof at the hole, one arm being rigidly fastened transversely to said mounting member while the other arm has a clearance hole to pass said stem and a metallic sleeve for gripping the outer conductor of a co-axial cable the inner conductor of which is the conductor having its bared end extending into the threaded stud, the free ends of said arms having formations for gripping the vehicle roof at the hole and means for forcing said free ends into gripping position.

4. An antenna for mounting on the roof of an automotive vehicle including a metallic hollow mounting member having a hollow stem extending therefrom to receive an insulated conductor, an insulator carried by said member and extending from said member in a direction opposite to said stem, a threaded stud carried by and extending upwardly from the insulator, said stud having a passageway therein to receive the bared end of said insulated conductor, a gripping device carried by said mounting member and adapted to engage the roof of the vehicle at a hole cut in the roof, a sealing pad of flexible impervious material surrounding said mounting member, a rigid upstanding insulator positioned on said pad and covering said mounting member. means on said threaded stud for locking said rigid insulator in place and an antenna rod having a base threaded to screw onto the end of said stud and lock against said stud locking means.

5. An antenna construction as defined in claim 4 further characterized in that said gripping device is attached to the stem carried by the mounting members.

6. An antenna for mounting on the roof of an automotive vehicle including a metallic hollow mounting member having a hollow stem extending therefrom to receive an insulated conductor, an insulator carried by said member and extending from said member in a direction opposite to said stem, a threaded stud carried by and extending upwardly from the insulator, said stud having a passageway therein to receive the bared end of said insulated conductor, a gripping device carried by said mounting member and adapted to engage the roof of the vehicle at a hole cut in the roof, a sealing pad of flexible impervious material surrounding said mounting member, a rigid upstanding insulator positioned on said pad and covering said mounting member, means on said threaded stud for locking said rigid insulator in place, and means for connecting a co-axial cable from a radio set to the mounting member and antenna, said means comprising a metallic sleeve adapted to be slid over the said stem to force the outer conductor of the cable into contact with the stem while the inner conductor of the cable goes through the stem and has its bared end passed into said stud passageway and fastened to the stud at the outer end of the insulator carrying the stud.

7. An antenna for mounting on the roof of an automotive vehicle including a metallic hollow mounting member having a hollow stem extending therefrom to receive an insulated conductor, an insulator carried by said member and extending from said member in a direction opposite to said stem, a threaded stud carried by and extending upwardly from the insulator, said stud having a passageway therein to receive the bared end of said insulated conductor, a gripping device carried by said mounting member and adapted to engage the roof of the vehicle at a hole cut in the roof, a sealing pad of flexible impervious material surrounding said mounting member, a rigid upstanding insulator positioned on said pad and covering said mounting member, means on said threaded stud for locking said rigid insulator in place, and means for connecting a co-axial cable from a radio set to the mounting member and antenna, said means comprising a metallic sleeve adapted to be slid over the said stem to force the outer conductor of the cable into contact with the stem the sleeve having at least one hole in its outer end so solder may be passed through the hole to anchor the sleeve to the outer conductor of the cable and a sleeve of insulating material adapted to be slipped over the metallic sleeve after it is located in place.

8. An automotive vehicle antenna construction including a metallic hollow mounting member with clamping means for fastening it to the roof of the vehicle, an insulator carried in greater part within said member, a rigid upright housing of insulating material covering said metallic housing, a stud carried by said insulator and projecting through the top of said rigid insulator, means for fastening the antenna per se to said stud, a sealing pad between the rigid insulator and vehicle roof and a stem extending downwardly from said mounting member and serving as means for passing the inner conductor of a co-axial cable to said stud and as a car ground for the outer conductor of said cable.

9. An automotive vehicle antenna construction including a mounting member, an insulator carried by said member, means carried by said insulator for supporting the antenna, a clamp for fastening said mounting member to the vehicle body, said clamp being folded so both ends will have parts on opposite sides of the material of the body at a hole of suitable diameter therein, means for fastening the clamp in position on the body and means for making electrical connection through the mounting member to the antenna.

10. An antenna construction for mounting on the body of an automotive vehicle including a mounting member having a part extending through a part of the vehicle body, an insulator carried by said mounting member, means carried by said insulator for supporting an antenna, a unitary clamp positioned around said extending part and adapted to have its opposite ends engage at least the inner surface of said body at a hole of suitable diameter therein, means for fastening the clamp securely to material around the hole, means for insulatingly passing the inner conductor of a co-axial cable through said mounting member and parts carried thereby to the antenna and means for anchoring the outer conductor of the cable to said extending part of the mounting member.

11. An automotive vehicle antenna construction including a mounting member, an insulator carried by said member and having a part protruding out of said member towards the antenna per se, means carried entirely by said insulator for supporting the antenna per se, said mounting member having an extension adapted to protrude into a hole in the vehicle body, a unitary clamp located on said extension with means for drawing the clamp into engagement with the body material at the hole, means for making electrical connection through said extension to said antenna supporting means and housing means of suitable material for covering all the parts between the antenna per se and the body of the vehicle.

12. An automotive vehicle antenna construction including a mounting member, an insulator carried by said member, means carried by said insulator for supporting the antenna per se, said mounting member having an extension adapted to protrude into a hole in the vehicle body, said extension being hollow and insulatingly carrying a socket connector therewithin which engages said antenna support means, the extension being exteriorly threaded at its free end, a clamp located on the extension adjacent the threaded end with means on said mounting member for forcing the clamp into gripping engagement with the body material at the hole, a plug connected to the interior conductor of a co-axial cable for engaging said socket connector, a sleeve having flanges at both ends carried on the outer part of said cable adjacent said plug and fastened to the outer conductor of the cable and a tubular nut slidably mounted on said sleeve between the flanges for engaging said threaded extension end for holding the cable in operative position and housing means of suitable material for covering all the parts between the antenna per se and the body of the vehicle.

13. An automotive vehicle antenna construction including a mounting member, an insulator carried by said member and having a part protruding out of said member towards the antenna per se, means carried entirely by said insulator for supporting the antenna, a unitary clamp for fastening said mounting member to the vehicle body, said clamp having its ends arranged so parts thereof will engage opposite sides of the material of the body at a hole of suitable diameter therein, means for fastening the clamp in position on the body and means for making electrical connection through the mounting member to the antenna.

JOSEPH B. CEJKA.

REFERENCES CITED

The following references are of record in the file of this patent:

UNITED STATES PATENTS

| Number | Name | Date |
|---|---|---|
| 2,354,314 | Harsted | July 25, 1944 |
| 2,427,503 | Lee | Sept. 9, 1947 |
| 2,434,663 | Bryers | Jan. 20, 1948 |
| 2,444,169 | Finneburgh et al. | June 29, 1948 |